(12) United States Patent
Wang et al.

(10) Patent No.: US 9,319,974 B2
(45) Date of Patent: Apr. 19, 2016

(54) COMMUNICATION TRANSMISSION METHODS AND SYSTEMS

(75) Inventors: Guotong Wang, Beijing (CN); Anthony Lee, San Diego, CA (US)

(73) Assignee: Intel Corporation, Santa Clara, CA (US)

(*) Notice: Subject to any disclaimer, the term of this patent is extended or adjusted under 35 U.S.C. 154(b) by 113 days.

(21) Appl. No.: 13/607,455

(22) Filed: Sep. 7, 2012

(65) Prior Publication Data

US 2013/0058277 A1 Mar. 7, 2013

Related U.S. Application Data

(60) Provisional application No. 61/531,811, filed on Sep. 7, 2011.

(51) Int. Cl.
| | |
|---|---|
| *H04W 48/18* | (2009.01) |
| *H04W 24/02* | (2009.01) |
| *H04W 88/06* | (2009.01) |
| *H04W 88/10* | (2009.01) |
| *H04W 48/08* | (2009.01) |

(52) U.S. Cl.
CPC .............. *H04W 48/18* (2013.01); *H04W 24/02* (2013.01); *H04W 48/08* (2013.01); *H04W 88/06* (2013.01); *H04W 88/10* (2013.01)

(58) Field of Classification Search
CPC .............. H04W 8/00; H04W 36/0011; H04W 36/0022; H04W 52/365; H04W 52/367; H04W 72/1215; H04W 92/08
USPC ........................... 370/328; 455/445, 522, 527
See application file for complete search history.

(56) References Cited

U.S. PATENT DOCUMENTS

| | | | | |
|---|---|---|---|---|
| 5,487,175 A | * | 1/1996 | Bayley | H04W 76/025 379/93.01 |
| 8,238,883 B1 | * | 8/2012 | Gunasekara | H04M 3/42187 455/414.1 |
| 2002/0055350 A1 | * | 5/2002 | Gupte | H04L 29/06 455/412.2 |
| 2002/0082029 A1 | * | 6/2002 | Ahmad | H04W 68/12 455/458 |

(Continued)

FOREIGN PATENT DOCUMENTS

GB 2464207 A * 4/2010 ............. H04L 69/40

OTHER PUBLICATIONS

Xing, S, Hosein, P, and Kwon, Y.; "A Novel Solution for Inter-Technology Handover"; IEEE Vehicular Technology Conference Proceedings (Spring 2010), pp. 1-5.*

(Continued)

*Primary Examiner* — Edan Orgad
*Assistant Examiner* — Steven Willmore
(74) *Attorney, Agent, or Firm* — Schiff Hardin LLP (57) ABSTRACT

Communication transmission methods and systems are provided. Firstly, a base station is configured to set an indicator for determining whether a first wireless communication technology and a second communication technology are allowed simultaneously for transmissions by the base station. Then, a user equipment, is configured to receive a voice call by a user equipment from the base station and determine whether to answer the voice call using the first wireless communication technology or the second communication technology, when the first wireless communication technology and the second communication technology are not allowed simultaneously shown by the indicator.

14 Claims, 5 Drawing Sheets

(56) References Cited

U.S. PATENT DOCUMENTS

| | | | | |
|---|---|---|---|---|
| 2004/0120283 A1* | 6/2004 | Rezaiifar | H04W 68/12 | 370/328 |
| 2005/0041640 A1* | 2/2005 | Nasielski | H04W 68/00 | 370/352 |
| 2005/0064891 A1* | 3/2005 | Chaudry | H04W 76/066 | 455/527 |
| 2008/0153500 A1* | 6/2008 | Zhao | H04L 67/26 | 455/445 |
| 2009/0252152 A1* | 10/2009 | Jeong et al. | 370/352 | |
| 2010/0062800 A1* | 3/2010 | Gupta | H04W 72/1215 | 455/552.1 |
| 2010/0135272 A1* | 6/2010 | Dayal | H04W 88/10 | 370/343 |
| 2010/0279709 A1* | 11/2010 | Shahidi | H04B 1/3805 | 455/456.2 |
| 2010/0284333 A1* | 11/2010 | Shirota | H04W 36/0022 | 370/328 |
| 2010/0291882 A1* | 11/2010 | Hu | H04W 72/0473 | 455/73 |
| 2010/0291966 A1* | 11/2010 | Hu | H04W 72/0473 | 455/552.1 |
| 2011/0044218 A1* | 2/2011 | Kaur | H04W 76/026 | 370/310 |
| 2011/0059739 A1* | 3/2011 | Huang | H04W 48/18 | 455/435.1 |
| 2011/0080894 A1* | 4/2011 | Iwamura | H04W 36/0022 | 370/331 |
| 2011/0117919 A1* | 5/2011 | Lee | H04W 36/02 | 455/436 |
| 2011/0159912 A1* | 6/2011 | Zong | 455/522 | |
| 2011/0292821 A1* | 12/2011 | Chin | H04W 36/0066 | 370/252 |
| 2011/0319071 A1* | 12/2011 | Beppler et al. | 455/424 | |
| 2011/0319072 A1* | 12/2011 | Ekici | H04W 48/18 | 455/426.1 |
| 2012/0005177 A1* | 1/2012 | Bao et al. | 707/705 | |
| 2012/0034881 A1* | 2/2012 | Warken | H04W 88/10 | 455/68 |
| 2012/0034910 A1* | 2/2012 | Fang | H04W 28/16 | 455/422.1 |
| 2012/0082046 A1* | 4/2012 | Ho | H04W 52/367 | 370/252 |
| 2012/0088455 A1* | 4/2012 | Love et al. | 455/67.11 | |
| 2012/0120789 A1* | 5/2012 | Ramachandran | H04W 36/0022 | 370/220 |
| 2012/0140743 A1* | 6/2012 | Pelletier | H04W 72/0453 | 370/335 |
| 2012/0163301 A1* | 6/2012 | Jang | H04W 48/18 | 370/328 |
| 2012/0172084 A1* | 7/2012 | Wu | H01Q 1/243 | 455/552.1 |
| 2012/0258707 A1* | 10/2012 | Mathias | H04W 36/30 | 455/426.1 |
| 2012/0270545 A1* | 10/2012 | Zhao | H04W 72/00 | 455/435.1 |
| 2012/0275350 A1* | 11/2012 | Kwok | H04B 1/525 | 370/277 |
| 2012/0289170 A1* | 11/2012 | Li | H04W 72/085 | 455/73 |
| 2012/0329514 A1* | 12/2012 | Noh | H04L 12/66 | 455/552.1 |
| 2013/0016696 A1* | 1/2013 | Adjakple | H04W 76/025 | 370/331 |

OTHER PUBLICATIONS

Xing, S., et al., A Novel Solution for Inter-Technology Handover, Vehicular Technology Conference Proceedings (Spring 2010), pp. 1-5.*

* cited by examiner

COMMUNICATION TRANSMISSION METHODS AND SYSTEMS

CROSS REFERENCE TO RELATED APPLICATIONS

This Application claims priority of U.S. Provisional Patent Application No. 61/531,811, filed on Sep. 7, 2011, the entirety of which is incorporated by reference herein.

BACKGROUND OF THE INVENTION

1. Field of the Invention

The disclosure is related to communication transmission systems and methods, and, more particularly to systems and methods that can indicate whether Simultaneous Voice and LTE (SV-LTE) is allowed by an indicator.

2. Description of the Related Art

Wireless communication systems are widely deployed to provide various telecommunication services such as telephony, video, data, messaging, and broadcast. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Teletransmissions System (UMTS) mobile standard promulgated by the Third Generation Partnership Project (3GPP). It is designed to better support mobile broadband Internet access by improving spectral efficiency, lower costs, improve services, make use of new spectrums, and better integrate with other open standards using OFDMA on downlinks (DL), and SC-FDMA on uplinks (UL), and multiple-input multiple-output (MIMO) antenna technology.

Interworking between different radio access technologies (RATs) such as LTE, CDMA, WiMax can be utilized to provide substantially continuous communication service for a mobile device in a multi-radio communication system. For example, interworking between respective radio access technologies can be utilized to facilitate data session continuity, voice call continuity, a fallback to circuit switched (CS) services, or the like, even in a case where a mobile terminal or other device moves between different radio access technologies. For a CDMA and LTE dual mode terminal, there is no need for cooperation between the CDMA and LTE if the terminal is configured with a dual transmitter and dual receiver. This means that the terminal can perform a CDMA voice call in parallel with an LTE data session, which is called Simultaneous Voice and LTE (SV-LTE). However, if LTE and CDMA run over close bands, the interference between them might become an issue.

BRIEF SUMMARY OF THE INVENTION

Communication transmission systems and methods are provided to overcome the above mentioned problems.

An embodiment of the invention provides a communication transmission method, comprising: setting an indicator, by a base station, for determining whether a first wireless communication technology and a second communication technology are allowed simultaneously for transmissions by the base station; receiving a voice call by a user equipment from the base station; and determining, by the user equipment, whether to answer the voice call using the first wireless communication technology or the second communication technology, when the first wireless communication technology and the second communication technology are not allowed simultaneously shown by the indicator.

An embodiment of the invention provides a communication transmission method, comprising: transmitting a message to a base station, by a user equipment, indicating whether transmissions using the LTE technology and the CDMA technology are supported simultaneously by the user equipment; and transmitting a service request to the base station, by the user equipment, for suspension of a data transmission transmitted via the LTE technology when transmissions using the LTE technology and the CDMA technology are not allowed simultaneously by the base station.

An embodiment of the invention provides a communication transmission system, comprising: a base station, configured to set an indicator for determining whether a first wireless communication technology and a second communication technology are allowed simultaneously for transmissions by the base station; and a user equipment, configured to receive a voice call by a user equipment from the base station and determine whether to answer the voice call using the first wireless communication technology or the second communication technology, when the first wireless communication technology and the second communication technology are not allowed simultaneously shown by the indicator.

An embodiment of the invention provides a communication transmission system. The communication transmission system comprises a base station; and a user equipment, configured to transmit a message to the base station, wherein the message indicates whether the user equipment supports transmissions using the LTE technology and CDMA technology simultaneously, and transmit a service request to the base station for suspension of a data transmission transmitted via the LTE technology when transmissions using the LTE technology and the CDMA technology are not allowed simultaneously.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
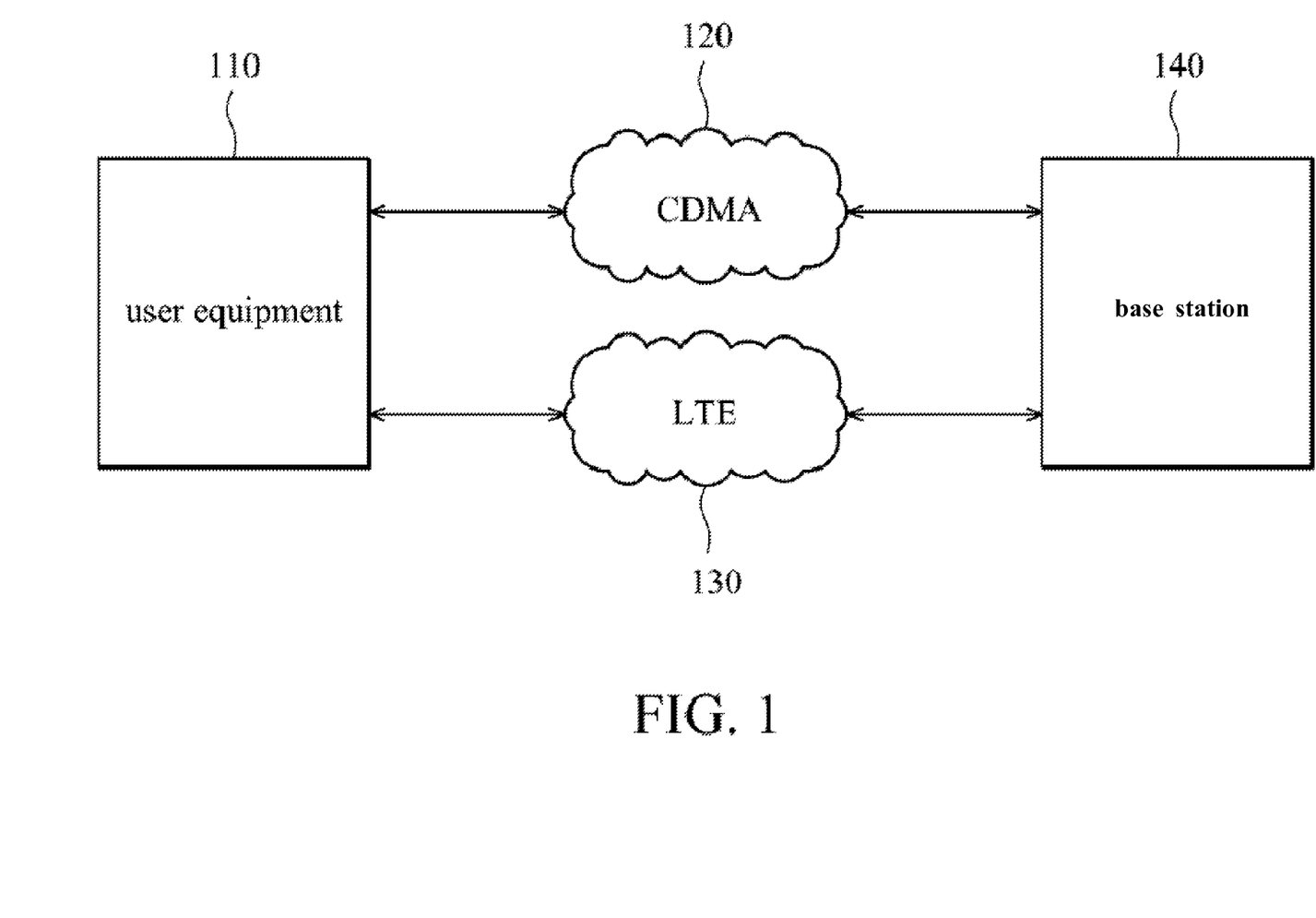
FIG. 1 is schematic diagram illustrating a communication transmission system 100 according to an embodiment of the invention.

FIG. 1 is schematic diagram illustrating a communication transmission system 100 according to an embodiment of the invention. In this embodiment, the communication transmission system 100 comprises a user equipment (UE) 110, a first communication network 120, a second communication network 130 and a base station 140.

Various embodiments are described herein in connection with the user equipment 110. A wireless terminal can refer to a device providing voice and/or data connectivity to a user. The user equipment 110 can be connected to a computing device such as a laptop computer or desktop computer, or it can be a self contained device such as a personal digital assistant (PDA). The user equipment 110 can also be called a system, a subscriber unit, a subscriber station, mobile station, mobile, remote station, access point, remote terminal, access terminal, user terminal, user agent, user device. The user equipment 110 can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem.

In one example, the first communication network 120 and the second communication network 130 can respectively operate according to various radio access technologies, such as, for example, LTE, CDMA2000 (e.g., 1x Radio Transmission Technology (RTT), etc.), WiMax, Wireless Local Area Network (WLAN), Universal Mobile Telecommunications System (UMTS), or the like. Specially speaking, in the invention, the first communication network 120 and a second communication network 130 can operate according to Simultaneous Voice-LTE (SV-LTE) which is utilized for simultaneous voice and data communication. Therefore, in the follow description, the first communication network 120 operates according to the CDMA technology and the second communication network 130 operates according to the LTE technology.

The base station 140 may be a fixed station or access network used for communicating with the terminals and may also be referred to as an access point, a Node B, an enhanced base station, an eNodeB (eNB), or some other terminology.

As shown in FIG. 1, the base station 140 is configured to set an indicator for determining whether the first communication network 120 and the second communication network 130 are allowed simultaneously for transmission by the base station 140 and a user equipment 110 is configured to determine whether to enable transmissions using the first communication network 120 and the second communication network 130 simultaneously, according to the indicator. In one embodiment, the base station 140 sets the indicator as "TRUE" when transmissions using the first communication network 120 and the second communication network 130 are allowed simultaneously by the base station 140 (i.e. SV-LTE is allowed), and sets the indicator as "FALSE" when transmissions using the first communication network 120 and the second communication network 130 are not allowed simultaneously by the base station 140 (i.e. SV-LTE is not allowed). Specifically speaking, the set of indicators have no impact in the Idle Mode (or Flight Mode) such as when the LTE is in an active mode and CDMA is in an idle mode, the LTE is in an idle mode and CDMA is in an active mode or the LTE and CDMA are both in idle mode.

Hereinafter the term "simultaneously" means the user equipment may handle and/or process the service request, transmission, or signaling, acquisition and any other communication status from the CDMA network and the LTE or SV-LTE at the same time. Furthermore, "simultaneously" also means when a user begins to attach to a CDMA network, the user has communicated through the LTE network, and vice versa. In one embodiment of the invention, the use equipment contains two or more sets of RF circuits which connect two set of transmitters and receivers. Those of ordinary will appreciate that if one set of RF circuit and one set of transmitter and receiver which make the user communication through two networks at the same time, not only the signaling but also the service also fall in the scope of the present invention.

In one embodiment, the indicator is a one-bit Boolean indicator. Of course any other format like a word, a flag or a signal completes the same function may be the indicator too. when the indicator is broadcasted via the LTE technology, the indicator is proposed into LTE protocol, Radio Resource Control (RRC), and it is included in system information block type 8 (SIB8) which contains information for CDMA and LTE interworking. The indicator in system information block type 8 is SV-LTESupport. When the indicator is set to "TRUE", the SV-LTE operation is allowed. When the indicator is set to "FALSE", the SV-LTE operation is not allowed. If the SV-LTE operation is not allowed, the user equipment capable of SV-LTE shall hang up the LTE data session when initialing a voice call via CDMA, whereafter the user equipment shall return to the LTE data session after the voice call is completed.

In one embodiment, when the indicator is broadcasted via the CDMA technology, the indicator in an SV-LTEAllowed field or SV-LTEAllowedCommon field. In the SV-LTEAllowed field, the field is configured to indicate one system support SV-LTE at one time. If simultaneous CDMA and LTE are allowed, then the base station shall set SV-LTEAllowed to '1'. Otherwise the base station shall set SV-LTEAllowed to '0'. In the SV-LTEAllowedCommon field, the field is configured to indicate that all systems support SV-LTE at one time. If simultaneous CDMA and LTE are allowed, then the base station shall set the LTEAllowedCommon to '1'. Otherwise the base station shall set the LTEAllowedCommon to '0'.

When the user equipment 110 receives a voice call, if transmissions using the first communication network 120 and the second communication network 130 are not allowed simultaneously by the base station 140, there are two methods to process the voice call. In one embodiment, the user equipment 110 will transmit an Extended Service Request to the base station 140 for suspension of a data transmission transmitted via the LTE technology, then the base station 140 processes the voice call via the CDMA technology. When the voice call ends, the data transmission via the LTE technology is returned by the base station 140. Another method is, if the user equipment 110 receives a voice call, the base station 140 still processes the voice call via LTE technology through a Voice over Internet Protocol (VoIP), when transmissions using the first communication network 120 and the second communication network 130 are not allowed simultaneously by the base station 140.

In one embodiment, the user equipment 110 is configured to transmit a message to the base station 140, wherein the message indicates whether the user equipment 110 supports transmissions using the LTE technology and CDMA technology simultaneously. In this embodiment, the LTE technology and the CDMA technology which are not allowed simultaneously may be due to two reasons. The first reason is that the base station may have set an indicator indicating that transmissions using the LTE technology and the CDMA technology are not allowed simultaneously by the base station 140. The second reason is that the power of the user equipment 110 may not be enough for an LTE data transmission when the user equipment 110 is receiving a voice call and the voice call occupies too much power.

Figure 2:
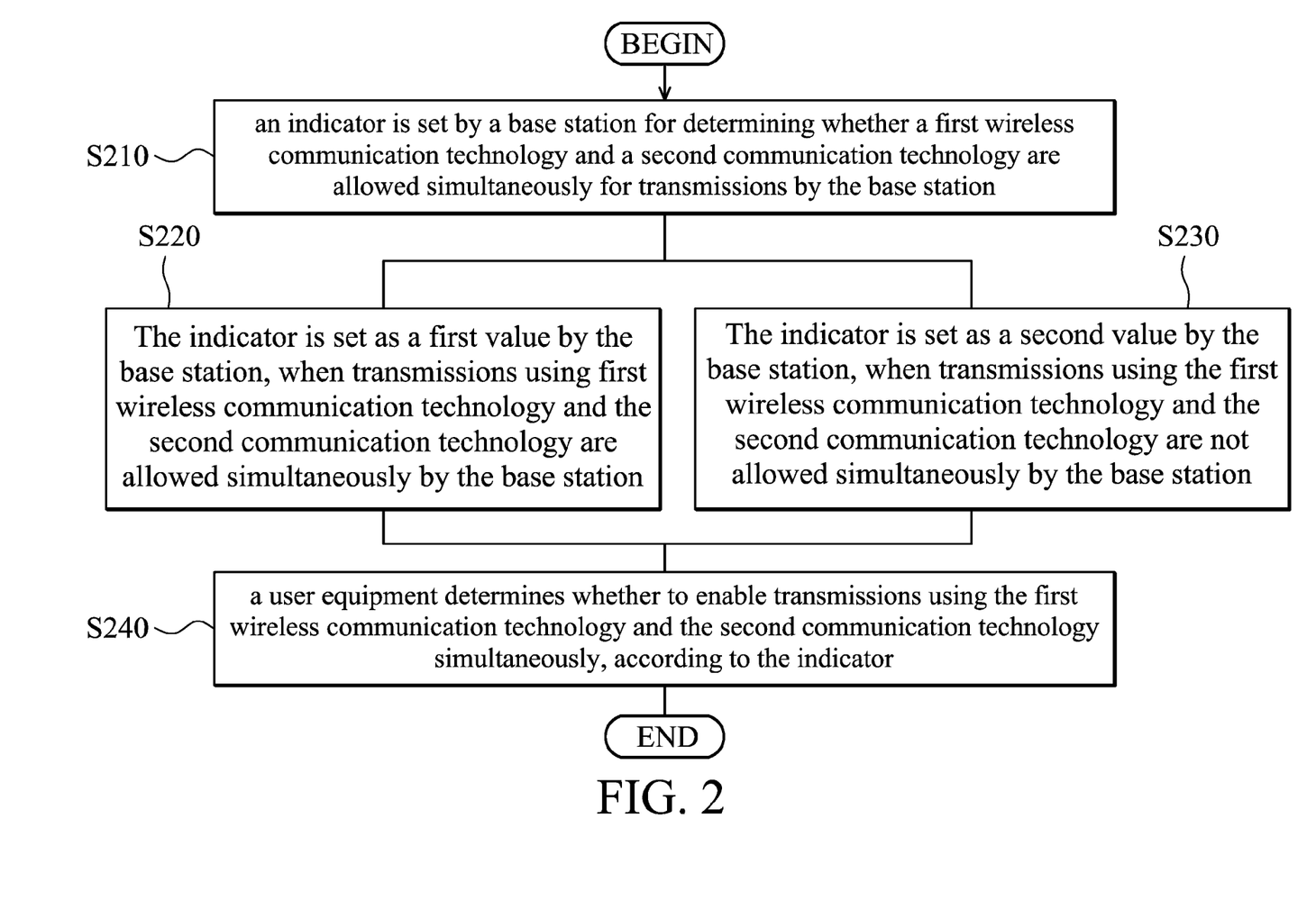
FIG. 2 is a flowchart of a communication transmission method according to an embodiment of the invention.

FIG. 2 is a flowchart of a communication transmission method according to an embodiment of the invention. According to the embodiment, the communication transmission method is configured to be applied in a user equipment such as a computer and portable device such as a tablet computer, Personal Digital Assistant (PDA), smart phone, mobile phone, mobile internet device, or notebook, wherein the user equipment supports SV-LTE. Firstly, in step S210, an indicator is set by a base station for determining whether a first wireless communication technology and a second communication technology are allowed simultaneously for transmissions by the base station. The indicator is set as a first value like "TRUE" or "1" by the base station (in step S230), when transmissions using first wireless communication technology and the second communication technology are allowed simultaneously by the base station (i.e. SV-LTE is allowed). The indicator is set as a second value like "FALSE" or "0" by the base station (in step S220), when transmissions using the first wireless communication technology and the second communication technology are not allowed simultaneously by the base station (i.e. SV-LTE is not allowed). Then, in step 240, a user equipment determines whether to enable transmissions using the first wireless communication technology and the second communication technology simultaneously, according to the indicator. In the embodiment, the first communication network operates according to the CDMA technology and the second communication network operates according to the LTE technology.

Figure 3:
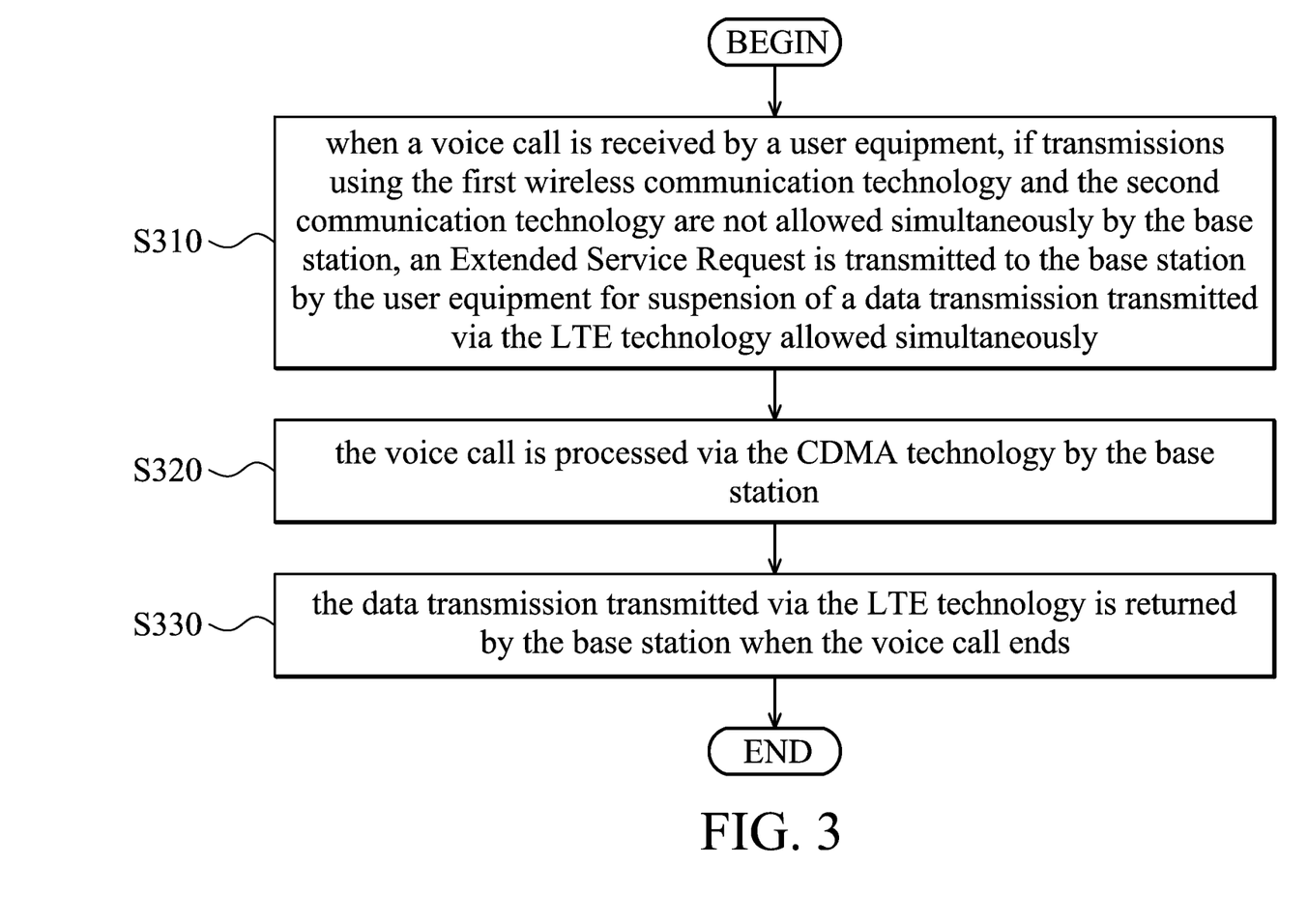
FIG. 3 is a flowchart of a communication transmission method according to an embodiment of the invention.

FIG. 3 is a flowchart of a communication transmission method according to an embodiment of the invention. Firstly, in step S310, when a voice call is received by a user equipment, if transmissions using the first wireless communication technology and the second communication technology are not allowed simultaneously by the base station, an Extended Service Request is transmitted to the base station by the user equipment for suspension of a data transmission transmitted via the LTE technology. Then, in step S320, the voice call is processed via the CDMA technology by the base station. In step S330, the data transmission transmitted via the LTE technology is returned by the base station when the voice call ends.

Figure 4:
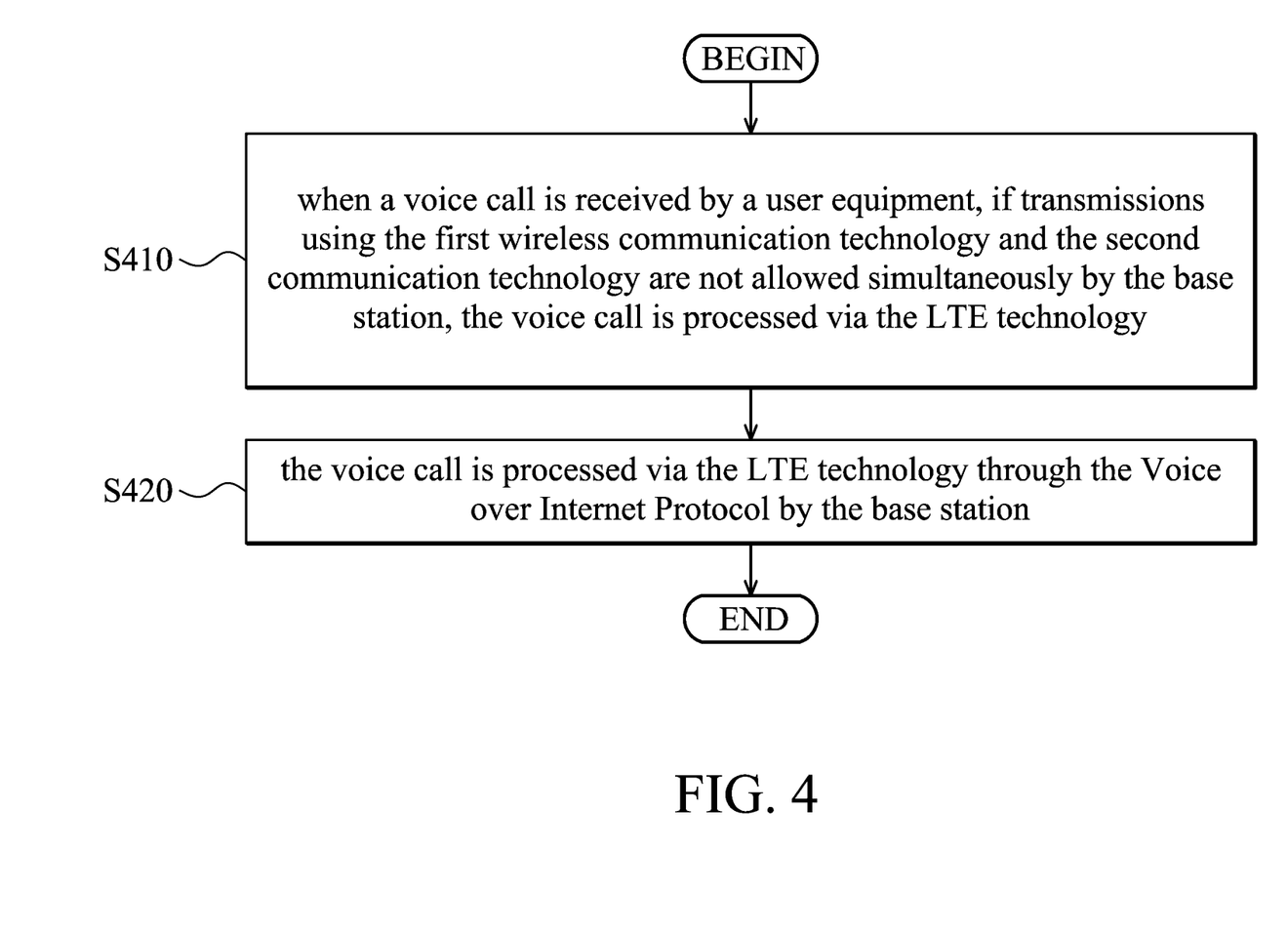
FIG. 4 is a flowchart of a communication transmission method according to an embodiment of the invention.

FIG. 4 is a flowchart of a communication transmission method according to an embodiment of the invention. Firstly, in step S410, when a voice call is received by a user equipment, if transmissions using the first wireless communication technology and the second communication technology are not allowed simultaneously by the base station, the voice call is processed via the LTE technology. In step S420, the voice call is processed via the LTE technology through the Voice over Internet Protocol (VoIP) by the base station.

Figure 5:
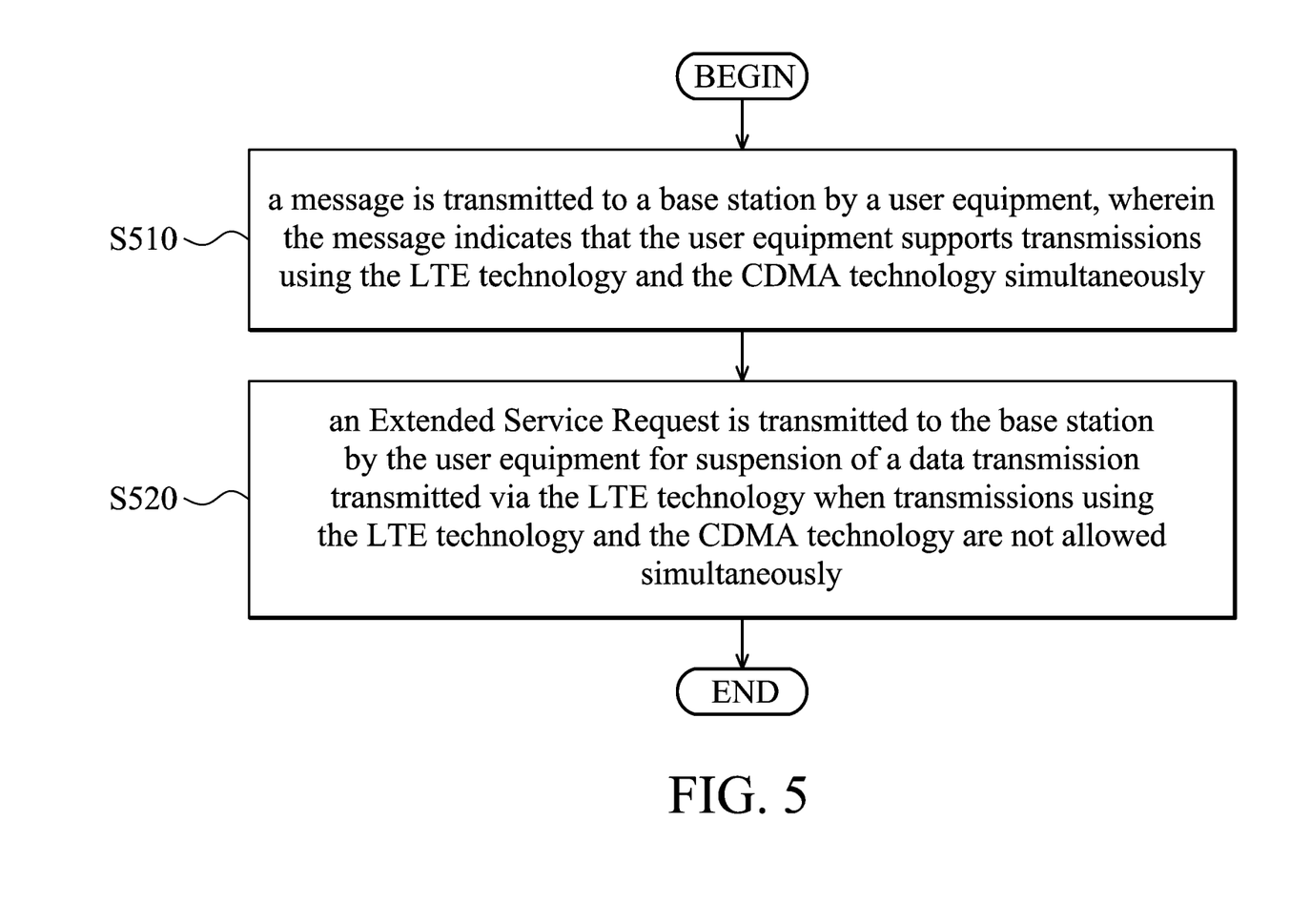
FIG. 5 is a flowchart of a communication transmission method according to an embodiment of the invention.

FIG. 5 is a flowchart of a communication transmission method according to an embodiment of the invention. Firstly, in step S510, a message is transmitted to a base station by a user equipment, wherein the message indicates that the user equipment supports transmissions using the LTE technology and the CDMA technology simultaneously (i.e. the user equipment supports SV-LTE). In step S520, an Extended Service Request is transmitted to the base station by the user equipment for suspension of a data transmission transmitted via the LTE technology when transmissions using the LTE technology and the CDMA technology are not allowed simultaneously. In this embodiment, the LTE technology and the CDMA technology are not being allowed simultaneously may be due to two reasons. The first reason is that the base station has set an indicator indicating that transmissions using the LTE technology and the CDMA technology are not allowed, simultaneously. The second reason is that the power of the user equipment is not enough for the LTE data transmission when the user equipment is receiving a voice call and the voice call occupies too much power.

Therefore, in the method of the communication transmission described in connection with the aspects disclosed herein, the indicator allows the operator of the base station to have more flexibility to control SV-LTE operations. This solves the issue of the interference between the CDMA and LTE in SV-LTE, when the CDMA and LTE run over close bands. In addition, when the power of the user equipment is not enough (i.e. the voice occupies too much power), the user equipment sends an Extended Service Request to the base station to suspend the LTE data session.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication transmission method, comprising:
   setting an indicator, by a base station, specifying whether a first wireless communication technology and a second wireless communication technology are allowed simultaneously for transmissions by the base station, wherein the first wireless communication technology and the second wireless communication technology are allowed simultaneously for transmissions means a user equipment may handle and/or process service request, transmission, or signaling, acquisition and any other communication status from the first wireless communication technology and the second wireless communication technology at the same time;
   communicating the indicator from the base station to the user equipment;
   receiving a voice call by the user equipment from the base station; and
   determining, by the user equipment, whether to answer the voice call using the first wireless communication technology or the second wireless communication technology, when the first wireless communication technology and the second wireless communication technology are not allowed simultaneously, as shown by the indicator;
   in response to the voice call being received by a user equipment, and when the indicator specifies that first wireless communication technology and the second wireless communication technology are not simultaneously allowed for transmissions by the base station, suspending a data transmission transmitted via the second wireless communication technology, by the base station.

2. The communication transmission method of claim 1, wherein the base station sets the indicator as a first value when transmissions using first wireless communication technology and the second wireless communication technology are allowed simultaneously by the base station, and sets the indicator as a second value when transmissions using the first wireless communication technology and the second wireless communication technology are not allowed simultaneously by the base station.

3. The communication transmission method of claim 1, wherein the first wireless communication technology is CDMA technology and the second wireless communication technology is LTE technology.

4. The communication transmission method of claim 1, further comprising:
   processing the voice call via the first wireless communication technology; and
   returning to the data transmission transmitted of the second wireless communication technology, by the base station when the voice call ends.

5. The communication transmission method of claim 4, further comprising:
   transmitting a service request to the base station, by the user equipment, for suspending the data transmission transmitted via the second wireless communication technology, when transmissions using the first wireless communication technology and the second wireless communication technology are not simultaneously allowed.

6. The communication transmission method of claim 1, further comprising:
   when the voice call is received by a user equipment, and the first wireless communication technology and the second wireless communication technology are simultaneously not allowed for transmissions by the base station, processing the voice call via the second wireless communication technology by the base station.

7. The communication transmission method of claim 6, further comprising:
   processing the voice call via the second wireless communication technology through a voice over Internet Protocol (VoIP), by the user equipment.

8. A communication transmission system, comprising:
   a base station, configured to set an indicator specifying whether a first wireless communication technology and a second wireless communication technology are allowed simultaneously for transmissions by the base station; and
   a user equipment, configured to receive a voice call by a user equipment from the base station and determine whether to answer the voice call using the first wireless communication technology or the second wireless communication technology, when the first wireless communication technology and the second communication technology are not allowed simultaneously shown by the indicator,
   wherein the first wireless communication technology and the second wireless communication technology are allowed simultaneously for transmissions means that the user equipment may handle and/or process service request, transmission, or signaling, acquisition and any other communication status from the first wireless communication technology and the second wireless communication technology at the same time;
   in response to the user equipment receiving the voice call, and when the indicator specifies that first wireless communication technology and the second wireless communication technology are not simultaneously allowed for transmissions by the base station, the base station suspends a data transmission.

9. The communication transmission system of claim 8, wherein the base station sets the indicator as a first value when transmissions using the first wireless communication technology and the second wireless communication technology are allowed simultaneously by the base station, and sets the indicator as a second value when transmissions using the first wireless communication technology and the second wireless communication technology are not allowed simultaneously by the base station.

10. The communication transmission system of claim 8, wherein the first wireless communication technology is the CDMA technology and the second wireless communication technology is the LTE technology.

11. The communication transmission system of claim 8, wherein the base station suspends a data transmission transmitted via the second wireless communication technology, by the base station, processes the voice call via the first wireless communication technology, and returns to the data transmission transmitted of the second wireless communication technology, by the base station when the voice call ends.

12. The communication transmission system of claim 11, wherein the user equipment transmits a service request to the base station for suspension of a data transmission transmitted via the second wireless communication technology, when transmissions using the first wireless communication technology and the second wireless communication technology are not simultaneously allowed.

13. The communication transmission system of claim 8, wherein when the user equipment receives a voice call, and the first wireless communication technology and the second wireless communication technology are not allowed simultaneously by the base station, the base station processes the voice call via the second wireless communication technology.

14. The communication transmission system of claim 13, wherein the base station processes the voice call via the second wireless communication technology through a Voice over Internet Protocol.

\* \* \* \* \*